US009884238B2

(12) United States Patent
Tsai

(10) Patent No.: US 9,884,238 B2
(45) Date of Patent: Feb. 6, 2018

(54) ROTATING FORCE SENSING KICKBOXING APPARATUS

(71) Applicant: Medal Sports (Taiwan) Corporation, Taipei (TW)

(72) Inventor: Kevin Chunhao Tsai, Kaohsiung (TW)

(73) Assignee: Medal Sports (Taiwan) Corporation, Taipei (TW)

( * ) Notice: Subject to any disclaimer, the term of this patent is extended or adjusted under 35 U.S.C. 154(b) by 37 days.

(21) Appl. No.: 14/948,607

(22) Filed: Nov. 23, 2015

(65) Prior Publication Data

US 2016/0074734 A1 Mar. 17, 2016
US 2017/0239548 A9 Aug. 24, 2017

Related U.S. Application Data

(63) Continuation-in-part of application No. 14/707,610, filed on May 8, 2015, now Pat. No. 9,561,420, which is a continuation of application No. 13/918,515, filed on Jun. 14, 2013, now Pat. No. 9,027,415, application No. 14/948,607, which is a continuation-in-part of application No. 29/526,387, filed on May 8, 2015.

(51) Int. Cl.
*G01D 7/00* (2006.01)
*A63B 69/32* (2006.01)
*A63B 24/00* (2006.01)
*G01L 5/00* (2006.01)

(52) U.S. Cl.
CPC .......... *A63B 69/32* (2013.01); *A63B 24/0062* (2013.01); *G01L 5/0052* (2013.01)

(58) Field of Classification Search
CPC ............ A63B 69/32; A63B 2024/0043; A63B 2071/026; A63B 2071/0694; A63B 2207/02; A63B 2225/50; G01L 5/0052
USPC ...................................... 73/862.041–862.046
See application file for complete search history.

(56) References Cited

U.S. PATENT DOCUMENTS

| 1,620,598 A | 3/1927 | Foster |
| 2,203,259 A | 6/1940 | Gilman |
| 2,237,599 A | 4/1941 | Gilman |
| 2,586,283 A | 2/1952 | Wynn |

(Continued)

OTHER PUBLICATIONS

Majik Kickboxing Game, East Point Sports Majik Kickboxing Game, Aug. 1, 2011.

(Continued)

*Primary Examiner* — Max Noori
(74) *Attorney, Agent, or Firm* — Honigman Miller Schwartz and Cohn LLP

(57) ABSTRACT

A rotating force sensing kickboxing apparatus is disclosed. An example apparatus includes a support member including a first connector located at a bottom portion of the support member and a body. The apparatus also includes a sensor attached to the body, the sensor configured to detect an object striking a portion of an exterior side of the body. The apparatus further includes a stand including a circular recessed channel and a second connector secured within the circular recessed channel and configured to connect to the first connector. The second connector is configured to rotate within the circular recessed channel. The connection of the first connector to the second connector enables the body and the support member to be rotatable with respect to the stand.

18 Claims, 14 Drawing Sheets

(56) References Cited

U.S. PATENT DOCUMENTS

| | | | |
|---|---|---|---|
| 4,658,897 A | 4/1987 | Kompanek et al. | |
| 4,974,833 A | 12/1990 | Hartman et al. | |
| 5,147,258 A * | 9/1992 | Donohue | A63B 69/205 482/83 |
| 5,330,403 A | 7/1994 | Kuo | |
| 5,674,157 A * | 10/1997 | Wilkinson | A63B 5/11 482/27 |
| D390,897 S | 2/1998 | Wade | |
| D419,901 S | 2/2000 | Alt | |
| 6,027,435 A | 2/2000 | Nadorf et al. | |
| 6,056,674 A | 5/2000 | Cook | |
| 6,122,846 A | 9/2000 | Gray et al. | |
| 6,188,742 B1 | 2/2001 | Schousek et al. | |
| 7,014,526 B1 | 3/2006 | Chamberlin | |
| RE39,372 E | 11/2006 | Kuo | |
| 7,219,729 B2 | 5/2007 | Bostick et al. | |
| 7,678,029 B2 | 3/2010 | Ng | |
| 7,704,194 B1 | 4/2010 | Chen | |
| D731,012 S | 6/2015 | Gilman | |
| 2002/0094917 A1 * | 7/2002 | Wang | A63B 69/206 482/86 |
| 2003/0216228 A1 | 11/2003 | Rast | |
| 2004/0152568 A1 | 8/2004 | Trian | |
| 2011/0130183 A1 | 6/2011 | Pelletter | |
| 2012/0096935 A1 | 4/2012 | Finke et al. | |
| 2012/0122634 A1 | 5/2012 | Lee | |
| 2014/0206504 A1 | 7/2014 | Barreras et al. | |
| 2014/0239984 A1 | 8/2014 | Alameh et al. | |

OTHER PUBLICATIONS

Interlink, Interlink Electronics FSR Force Sensing Resistors Integration Guide, Oct. 22, 2010.
Arcade Alley Kick Boxing, Arcade Alley Kick Boxing Trainer with Speed Bag Gloves, Jul. 1, 2008.
Moose Mountain ESPN, Moose Mountain ESPN Kickboxing Trainer Review, Dec. 2, 2009.
Majik, Stick & Move Kickboxing Trainer: Assembly Instructions, excerpt from www.eastpointsports.com (8 pages).
Cobinrox, The Gadgeteer, Moose Mountain ESPN Kickboxing Trainer Review, Dec. 2, 2009, obtained from http://the-gadgeteer.com/2009/12/02/moose-mountain-espn-kickboxing-trainer-review/ (12 pages).
Franklin Sports, Youth Sports 2001 Catalog Excerpts (3 pages).

* cited by examiner

ROTATING FORCE SENSING KICKBOXING APPARATUS

PRIORITY CLAIM

This application claims priority to and the benefit as a continuation-in-part application of U.S. patent application Ser. No. 14/707,610 filed on May 8, 2015, which is a continuation application of U.S. Pat. No. 9,027,415 filed on Jun. 14, 2013, the entire contents of which are hereby incorporated by reference. The present application also claims the benefit of U.S. Design Pat. No. 29/526,387 filed on May 8, 2015, the entirety of which is incorporated herein by reference.

BACKGROUND

Recreational punching or strike bags have been in use for many years. More recently, manufacturers have been including sensors and electronic devices to detect and visually/audibly register strikes of particular targets on the punching bag. These sensors have to be durable enough to withstand the constant (and sometimes high) forces while at the same time being sensitive enough to register or detect contact.

FIG. 1 shows a diagram of an exploded partial view of a known punching bag 100, which includes an outer shell 102 and an inner shell 104. The outer shell 102 includes one or more target areas 106 that graphically indicate the locations of respective force sensors 108. The inner shell 104 is configured or designed to align with the outer shell 102 such that each force sensor 108 is directly behind the respective target area 106. This configuration ensures that a force is recorded by the sensor 108 when a user strikes the target area 106.

While the inner shell 104 is shown as a single layer, in many known punching bags 100 the inner shell 104 includes multiple electrical layers separated by foam. A contact of the target area 106 causes one electrical layer to contact another electrical layer through the foam, thereby completing a circuit (similar to triggering a switch). An electronic reader detects a voltage from the completed circuit and registers the contact.

In the illustrated known punching bag 100, the outer shell 102 is connected to the inner shell 104 along the edges or seams of the shells. For instance, a top edge 110 of the outer shell 102 is connected to a top edge of the inner shell 104. This connection causes the inner shell 104 to hang behind the outer shell 102. It should be appreciated that this construction results in an air gap between most of the inner shell 104 and outer shell 102 including the locations of the sensors 108 and target areas 106.

An issue with this configuration is that with repeated use, the inner shell 104 can become misaligned with the outer shell 102. For instance, the top edge 112 could become partially or fully disconnected from the outer shell 102. Additionally or alternatively, the inner shell 104 (including the sensor 108) can become ripped or stretched through use, thereby causing misalignment. In yet other instances, the air gap between the shells 102 and 104 could widen, thereby resulting in reduced sensor sensitivity. As a result of this misalignment, a strike of the target area 106 is not necessarily detected by the sensor 108. There accordingly exists a need to provide an accurate and durable punching apparatus that overcomes at least some of the above mentioned the issues.

SUMMARY

The present disclosure provides a new and innovative rotating force sensing kickboxing apparatus. The example kickboxing apparatus is configured such that a support member or body includes a first connector and a base includes a second connector. Either of the first connector or the second connector is rotatable such that connection of the first connector to the second connector enables the support member or body to be rotatable with respect to the base. The use of the first and second connectors creates a secure connection between the body or support member and the base to withstand frequent impacts by users. The secure connection also enables the body to rotate smoothly for an improved user experience.

In an example embodiment, a rotating kickboxing apparatus includes a support member including a first connector located at a bottom portion of the support member and a body. The apparatus also includes a sensor attached to the body, the sensor configured to detect an object striking a portion of an exterior side of the body. The apparatus further includes a stand having a circular recessed channel and a second connector secured within the circular recessed channel and configured to connect to the first connector. The second connector is configured to rotate within the circular recessed channel. The connection of the first connector to the second connector enables the body and the support member to be rotatable with respect to the stand.

In another example embodiment, a rotating kickboxing apparatus includes a body connected to an inflatable support member. The example body includes an exterior surface and an interior surface. A bottom portion of the inflatable support member includes a first connector configured to enable the support member and the body to be rotatable. The example apparatus also includes a sensor attached to a portion of the interior surface of the first body. The sensor is configured to detect an object striking a portion of the exterior surface of the first body. The example apparatus further includes a base configured to be connected to the bottom portion of the body. The base includes a stand positioned inside the base that defines a circular recessed channel and a second connector secured within the circular recessed channel and configured to connect to the first connector of the support member. The second connector is configured to rotate within the circular recessed channel. The connection of the first connector to the second connector accordingly enables the body and the support member to be rotatable with respect to the base.

Additional features and advantages of the disclosed system, method, and apparatus are described in, and will be apparent from, the following Detailed Description and the Figures.

DETAILED DESCRIPTION

The present disclosure relates in general to a kickboxing game and in particular, to a force sensing kickboxing apparatus and method of manufacture. Throughout the following disclosure reference is made to a kickboxing game that includes an inflatable body with sensors configured to record contact from users. However, it should be appreciated that the apparatus and method of manufacture described herein may be applied to other related applications. For example, the apparatus may be used as a boxing trainer, a judo trainer, a karate trainer, a wrestling trainer, or any other recreational or professional device used to record contact from a user. Moreover, while the kickboxing game is disclosed as including an inflatable body, it should be appreciated that the disclosed apparatus could be applied to solid non-inflatable bodies.

Kickboxing Apparatus

Figure 2:
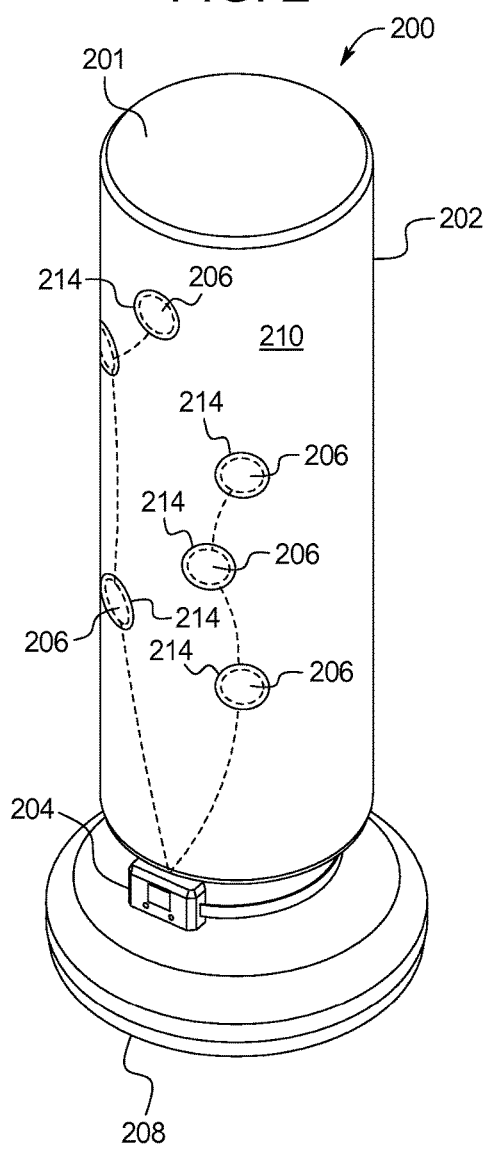
FIG. 2 shows a diagram of an example kickboxing apparatus, according to an example embodiment of the present disclosure.

FIG. 2 shows a diagram of an example kickboxing apparatus 200. The example apparatus 200 includes a support member 201, a body 202, an electronic device 204, and sensors 206. The example kickboxing apparatus 200 also includes a base 208 that supports the body 202 and the support member 201. In some embodiments, the base 208 is integrated with the body 202 and/or the support member 201. For example, the base 208 may be comprised of a plastic sheet that is connected to a plastic sheet of the body 202 or the plastic sheet of the support member 201. In other examples, the base 208 is removably connected to the body 202 and/or the support member 201.

In this embodiment, both the base 208 and the support member 201 are inflatable. For example, the base 208 and/or the support member 201 may include a plastic shell or container that is fillable with water or sand. In other embodiments, the base 208 and/or the support member 201 may be solid.

The electronic device 204 is configured to use signals, data, etc. from the sensors 206 to determine or detect a strike or contact (e.g., to provide information regarding the body 202). In some examples, the electronic device 204 may determine the amount of force applied and/or which of the sensors 206 was contacted. Further, the electronic device 204 may provide power to light emitting devices provided in conjunction with the sensors to light portions of the body 202. Moreover, the electronic device 204 may manage or control game play, as described in more detail below.

The example body 202 includes a sheet that is connected to the cylindrical support member 201, which is conducive to receiving strikes and contact from a user. In some examples, the body 202 and/or the support member 201 may include hard plastic, rubber, chemical fiber, etc. In other examples, the support member 201 may comprise one or more plastic sheets combined together to form a cylinder. In these other examples, an interior of the support member 201 may be filled with a gas, liquid, or solid to provide shape and support. It should be appreciated that in other examples, the support member 201 can include other shapes (e.g., cylindrical, figurine, etc.) and/or be comprised of other materials (e.g., rubber, canvas, etc.). As can be appreciated, the support member 201 includes a relatively harder material than the body 202 so as to be able to support the body 202 during use.

The example body 202 may be connected to only a portion of the support member 201 (e.g., a front-facing side). Alternatively, the body 202 may be attached around the entire support member 201, as shown in FIG. 2. It should be appreciated that the sensors 206 are only attached to the body 202 and not the support member 201.

The example body 202 includes an externally facing side 210 and an internally facing side 212. The example externally facing side 210 is configured to include graphics. For example, the externally facing side 210 includes target areas 214, which graphically represent locations of sensors 206. The target areas 214 may be graphically represented as a circular area including an 'X' a number, a letter, and/or any other symbol. Alternatively, the target areas 214 may be graphically represented as individual pictures, symbols, etc.

The externally facing side 210 may also include a picture or figure to induce a user to strike the kickboxing apparatus 200. Examples include a kickboxer, a robot, a boxer, a wrestler, a famous personality, an animated character, etc. The target areas 214 are positioned to be located around sensitive or important areas of the figure. For instance, the target areas 214 may be located at joints and power supply of a graphical robot. In other examples, the externally facing side 210 may not include graphics.

Figure 3:
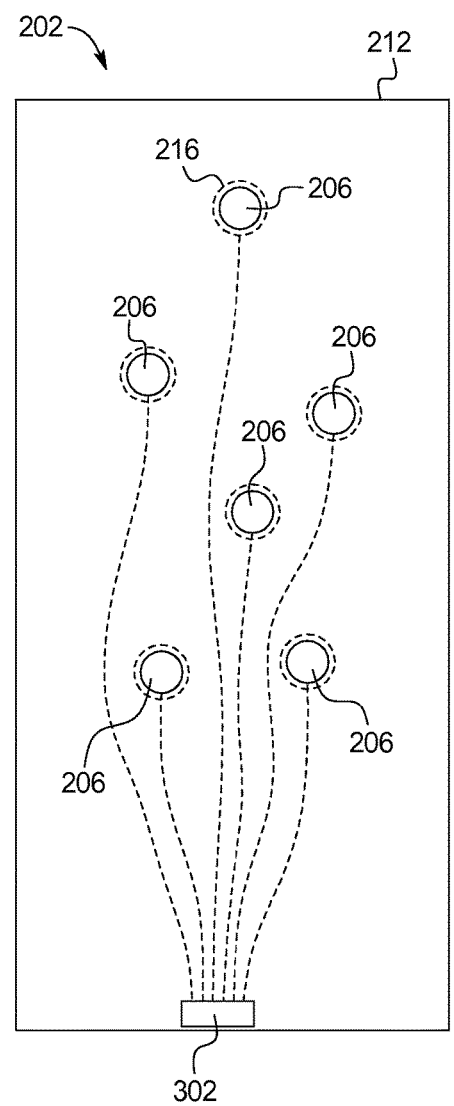
FIG. 3 shows a diagram of an internally facing side of a body prior to be formed into the kickboxing apparatus of FIG. 2, according to an example embodiment of the present disclosure.

The internally facing side 212 is shown in FIG. 3. This figure shows a diagram of the internally facing side 212 prior to be formed into the kickboxing apparatus 200 of FIG. 2. It should be appreciated that during manufacture, it is relatively easier to print graphics and attach sensors to the body 202 when it is in the form of a flat sheet rather than a formed structure. For instance, during manufacture, plastic sheets comprising the body 202 may be cut into the form shown in FIG. 3. These sheets are then printed and attached to the sensors 206. The sheets may then be rolled into the cylinder shape shown in FIG. 2 and connected to the support member 201 using chemical, mechanical, or heat-based adhesives and/or sealing methods.

As shown in FIG. 3, the internally facing side 212 includes at least one sensor 206. As mentioned above, the sensors 206 are positioned on the internally facing side 212 at locations corresponding to target areas 214 printed or otherwise graphically displayed on the externally facing side 210. Each of the sensors 206 are connected to a wire connector 302, which is connected to the electronic device 204 during manufacture. The wire connector 302 provides a single interface to accumulate the wires from each of the sensors 206 to provide one connection point to the electronic device 204. In other examples, the sensors 206 may be wirelessly communicatively coupled to the electronic device 204. In these other examples, the sensors 206 may include batteries or be wirelessly powered by the electronic device 204. Alternatively, the sensors 206 may include transducers (e.g., a microelectromechanical system ("MEMS") such as a piezoelectric device configured to transduce force into a voltage) that convert force into power. This locally generated power may be used to transmit detection signals to the electronic device 204 and/or to illuminate a light emitting device positioned in proximity to the sensor 206.

The example sensors 206 are connected to the internally facing side 212 of the body 202 using a sensor housing 216. The sensor housing 216 includes a sheet section that encloses the sensor 206. The sensor housing 216 also causes the sensor 206 to be adjacent with the internally facing side 212. This configuration secures the sensors 206 permanently in place in proximity to the target areas 214 and is relatively more durable than the known systems described above. This configuration is also relatively more cost efficient than the known systems because only a sheet portion is used for each sensor 206 instead of an interior inner shell.

Additional Embodiments of the Kickboxing Apparatus

While FIGS. 2 and 3 show the target areas 214 and sensors 206 positioned at varying heights for a portion of the body 202, in other embodiments the target areas 214 and sensors 206 may be positioned around the circumference of the body 202. For example, some target areas 214 and sensors 206 may be positioned on a front-facing side of the externally facing side 210 and other target areas 214 and sensors 206 may be positioned on a rear-facing side. Such a configuration would encourage and/or prompt users to move around the kickboxing apparatus 200.

This configuration of circumferentially positioned target areas 214 and sensors 206 may also be provided in conjunction with a base 208 that rotates the body 202. For example, the electronic device 204 may provide instructions (or electrical signals) causing an electric motor or rotor in the base 208 to rotate the body 202. The electronic device 204 may randomly select the rotation. Alternatively, the rotation may be predetermined based on a timed sequence. It can be appreciated that this rotation may increase the challenge of striking the target areas 214, especially with the inclusion of rear-facing target areas.

Sensor Connectivity Embodiment

Figure 4:
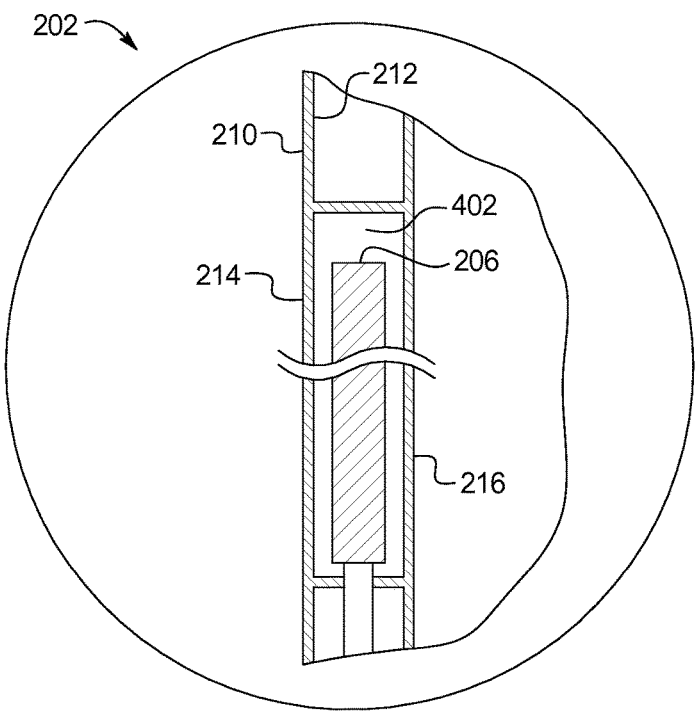
FIGS. 4 and 5 are diagrams illustrating the connectivity of sensors to the internally facing side of the body of FIG. 2, according to an example embodiment of the present disclosure.
Figure 5:
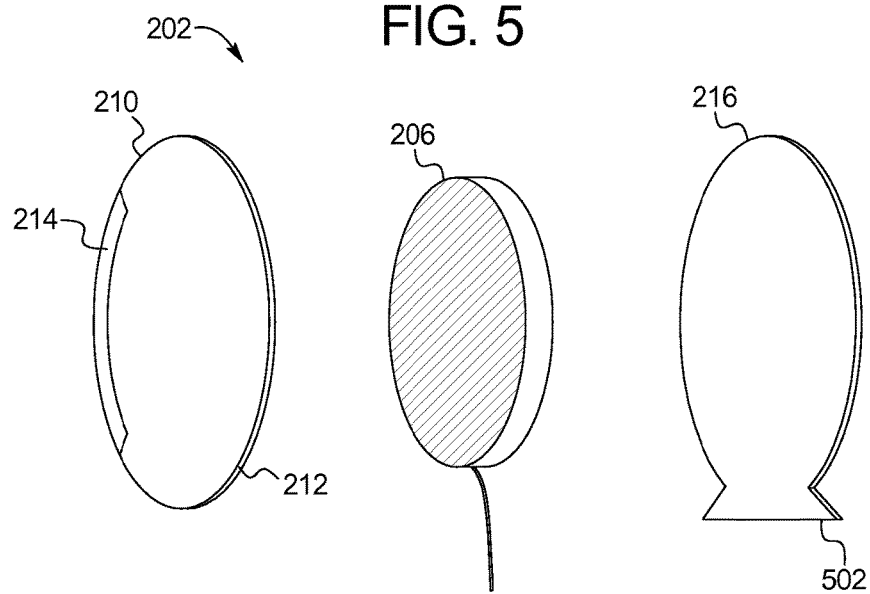

FIGS. 4 and 5 are diagrams illustrating the connectivity of the sensors 206 to the internally facing side 212 of the body 202. In particular, FIG. 4 shows a sensor housing 216 connected to the side 212 and FIG. 5 shows an exploded view of the side 212, sensor 206, and sensor housing 216. In the illustrated examples, the sensor 206 includes a layered printed circuit board ("PCB") that has a circular or oval shape. In some embodiments, the sensor 206 has a thickness between 1 millimeter and 10 millimeters. The example sensor housing 216 includes a roughly circular-shaped plastic portion that includes an area larger than the sensor 206. The sensor housing 216 may include a wire portion 502 configured to enable a wire to be positioned from the sensor 206 to the electronic device 204. In some embodiments, the sensor housing 216 has thickness that is less than 2 millimeters.

In the illustrated embodiments of FIGS. 4 and 5, the senor 206 is positioned against the internally facing side 212 of the body 202 in proximity, adjacent, or otherwise across from the target area 214 printed on the externally facing side 210. In some examples, the internally facing side 212 includes one or more marks indicating where the sensor 206 is to be positioned. The sensor 206 is then secured into place by positioning the sensor housing 216 over the sensor 206 and connecting the edges of the sensor housing 216 to the internally facing side 212, thereby forming a pocket 402 in which the sensor 206 is deposed. It should be noted that at least some of the wire portion 502 is not connected to the internally facing side 212 to enable the wire to pass out of the sensor housing 216.

To secure the sensor 206 in place, the sensor housing 216 is positioned so that at least 1 millimeter of material overhangs or extends from the sensor 206 and contacts the internally facing side 212. The edges of the sensor housing 216 are chemically, mechanically, or otherwise attached to the internally facing side 212. In some examples, localized heating and/or pressure may be applied to cause the edges of the sensor housing 216 to integrate with (e.g., melt into) the internally facing side 212. It should be appreciated that the connection method used should provide a connection between the sensor housing 216 and internally facing side 212 that can withstand the constant impact of the body 202 being struck.

As can be appreciated from FIG. 4, the above described configuration enables the sensor 206 to be secured into place while at the same time not physically connecting any part of the sensor 206 to the body 202 or the sensor housing 216. Instead, the configuration enables the sensor 206 to float in a fixed position of the pocket 402, thereby ensuring that the sensor 206 can accurately detect a contact while at the same time being relatively durable because the sensor 206 is not physically connected to anything. For instance, the amount of overlap of the sensor housing 216 and the amount of sensor housing 216 connected to the internally facing side 212 is selected to provide a large enough pocket 402 to enclose the sensor 206 without actuating the force sensing components of the sensor 206 but close enough to the body 202 to detect contact. For instance, while FIG. 4 shows the pocket as providing some distance (e.g., between 0.5 and 2 millimeters) between the sensor 206 and the side 212/sensor housing 216, in other embodiments, the sensor 206 may contact at least one of the internally facing side 212 and the sensor housing 216. In these other embodiments, the sensor 206 may include a buffer that prevents casual contact from causing contact detection.

Sensor Embodiment

Figure 6:
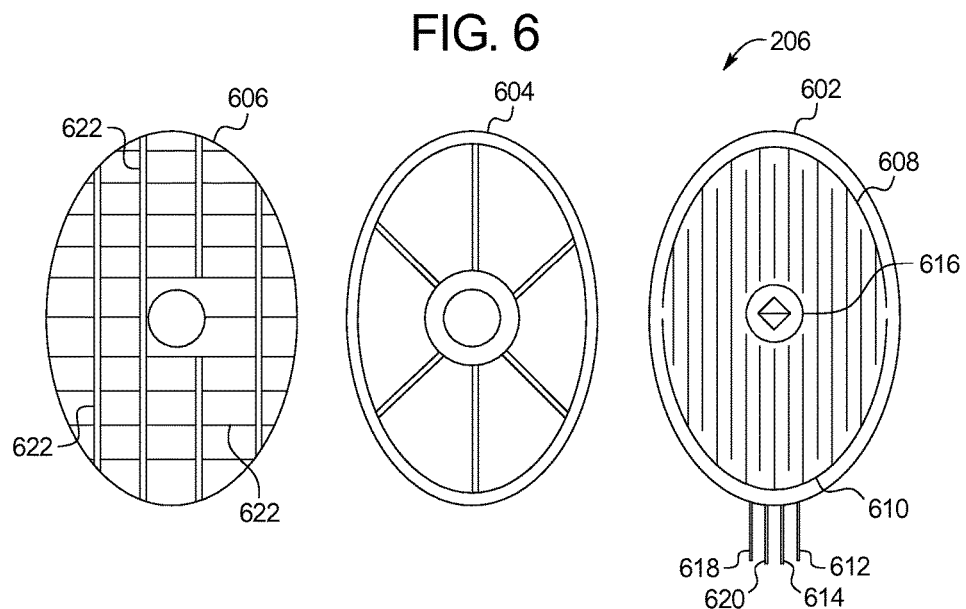
FIG. 6 shows a diagram of an exploded-view of the sensor of FIGS. 2-5, according to an example embodiment of the present disclosure.

FIG. 6 shows a diagram of an exploded-view of the sensor 206 of FIGS. 2-5. It should be appreciated that FIG. 6 provides only one example of sensor 206. For example, the sensor 206 could be configured to have a circular-shape, rectangular-shape, etc., include additional layers and/or components, and/or have different dimensions. Additionally, as described below, different types of sensors 206 could be used in other embodiments.

The example sensor 206 of FIG. 6 includes a circuit board 602, a separation layer 604, and a contact layer 606. The example sensor 206 is formed by placing the separation layer 604 between the contact layer 606 and the circuit board 602. In some instances, the separation layer 604 is secured to the circuit board 602 and the contact layer 606 via pressure provided by a laminate. For example, a plastic-based tape may wrap around the externally facing sides of the contact layer 606 and the circuit board 602 (e.g., the sides not in contact with the separation layer 604) holding the layers 604 and 606 and circuit board 602 in place. In other examples, a chemical adhesive or mechanical fastener may bind the contact layer 606 and separation layer 604 to the circuit board 602.

The example circuit board 602 includes positive conductive traces 608 and negative conductive traces 610. The positive traces 608 are connected to a common positive electrode that receives a positive voltage provided by, for example the electronic device 204 via a wire 612. Similarly, the negative traces 610 are connected to a common negative (or ground) electrode that receives a negative or ground potential provided by the electronic device 204 via a wire 614. In this embodiment, the positive conductive traces 608 are interspaced between the negative conductive traces 610 in an alternating manner.

The example circuit board 602 also includes a light emitting device 616 configured to generate light using power provided by the electronic device 204. The power may be provided via wires 618 and 620 connected respectively to positive and ground potentials. In this embodiment, the light emitting device 616 is shown as being located within a center of the circuit board 602. In other embodiments, the light emitting device 616 can be located along an edge of the circuit board 602 or, alternatively, be adjacent to the circuit board 602. In yet other embodiments, the circuit board 602 may not include a light emitting device 616.

The example circuit board 602 is formed of a hard plastic including, for example, polyvinyl chloride ("PVC"). In other examples, the circuit board 602 may include cured laminates. It should be appreciated that the rigid nature of the circuit board 602 enables the conductive traces 608 and 610 to effectively contact portions of the contact layer 606 during a strike of the sensor 206. This configuration provides relatively accurate detections of contact force. It should also be appreciated that the rigid circuit board 602 can withstand prolonged and extensive forces without ripping, tearing, or otherwise breaking.

The example separation layer 604 includes an elastic porous material that functions as an insulator between the circuit board 602 and the contact layer 606. The separation layer 604 ensures that casual contact (e.g., a force below a predetermined threshold) does not cause the contact layer 606 to contact the circuit board 602. The example separation layer 604 may include foam or other compressible material.

In FIG. 6, the material portion of the separation layer 604 is shown as black lines. The white space of the separation layer 604 corresponds to open space that enables the contact layer 606 to contact the circuit board 602 when a force is applied. It should be appreciated that in other embodiments, the shape of the separation layer 604 may vary based on the circuit board 602 and/or the material used. For example, in other embodiments, the separation layer 604 may be formed into a grid pattern.

The example contact layer 606 of FIG. 6 includes a conductive film 622 arranged in a grid pattern. The conductive film 622 may include any material that provides for at least adequate conductivity (e.g., copper, silver, gold, doped carbon, etc.) for traces (shown as black lines). The traces are deposed on a thin plastic sheet that provides insulation between the traces. The conductive film 622 is arranged in a grid so that horizontal traces intersect at least one positive conductive trace 608 and one negative conductive trace 610 when a force is applied to the sensor 206. As such, the spacing and dimensions of the conductive film 622 may vary based on the dimensions of the separation layer 604, patterning of the conductive traces 608 and 610, and shape/dimension of the contact layer 606.

In an example embodiment of the sensor 206 of FIG. 6, a force is applied to an adjacently located target area 214. The force causes the contact layer 606 to bend inward and compress the separation layer 604. During or after compression, the force further causes portions of the contact layer 606 located opposite the open space of the separation layer 604 to move through the open space toward the circuit board 602. The contact between at least some of the conductive film and the circuit board 602 effectively shorts the contacted positive conductive traces 608 to contacted negative conductive traces 610. The electronic device 204 is configured to detect the short of the conductive traces 608 and 610 and registers that the contact or strike has been detected. The short may be detected by an increase in current to the sensor 206. Alternatively, the short may be determined by detecting an increase in voltage on the wire 614 connected to the negative conductive traces 610.

Other Sensor Embodiments

As mentioned above, the sensor 206 of FIG. 6 is not the only type of sensor that could be used within the kickboxing apparatus 200. For example, the sensor 206 could include a film of piezoresistive elements that generate a differential signal based on an amount of applied force. The electronic device 204 may use a magnitude of the differential signal to determine an amount of force applied.

Alternatively, the sensor 206 could include a pressure sensor that is configured to sense changes in air (or liquid) pressure in the pocket 402 based on an applied force. The sensor 206 can be configured to output a signal when the force exceeds a predetermined threshold or provide a signal representative of the amount of received force. In this embodiment, the electronic device 204 may use a magnitude of the signal to determine an amount of force applied.

In yet other examples, the sensor 206 may include one or more light emitters and one or more light detectors. The detectors may be positioned to detect a strike of the sensor 206 by detecting movement in transmitted light. In this embodiment, the electronic device 204 uses the signals output from the detectors to determine a strike and/or an amount of force associated with the strike.

Electronic Device Embodiments

Figure 7:
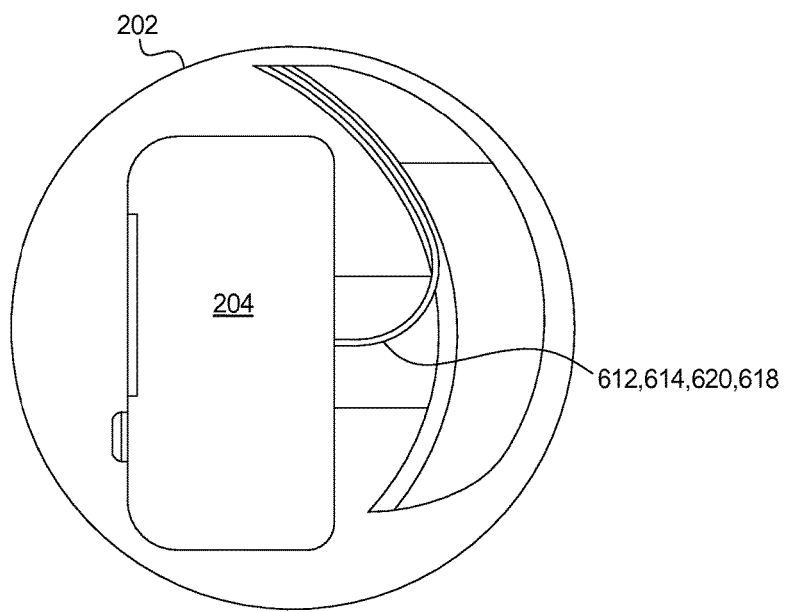
FIG. 7 shows a diagram of an electronic device of the kickboxing apparatus of FIGS. 2 and 3, according to an example embodiment of the present disclosure.

FIG. 7 shows a diagram of the electronic device 204 of FIGS. 2 and 3. The electronic device 204 includes a microprocessor with instructions stored in a memory. The instructions define how a sensor strike is determined and how information associated with the determination is provided to a user. The instructions may be preprogrammed or, alternatively, may be provided by a user.

As discussed above, the electronic device 204 is electrically connected to each of the sensors 206 via respective wires 612, 614, 618, and 620. The wires 618 and 620 provide power to the light emitting device 616 and the wires 612 and 614 are used to detect a signal provided by the sensor 206 responsive to receiving a strike. In other examples, the electronic device 204 may be wirelessly communicatively coupled to each of the sensors 206.

The example electronic device 204 may be configured to provide an AC or DC voltage to the sensor 206 and/or the light emitting device 616. In some instances, the electronic device 204 may only provide power to a sensor 206 and/or a corresponding light emitting device 616 at certain times. For example, the electronic device 204 may apply power to a light emitting device 216 responsive to detecting a strike at a respective sensor 206. Alternatively, the light emitting device 216 may provide power to the light emitting device 616 at certain times as a prompt to a user to strike the corresponding target area 214.

The electronic device 204 can include any type of computing device that is configured to determine when a strike is detected by a sensor 206 and output information associated with the determination. For instance, the electronic device 204 can include a microcontroller, a tablet computer, a smartphone, a processor, an application specific integrated circuit ("ASIC"), etc. The electronic device 204 may be connected to a network via any wired or wireless connection including, for example, 4G LTE, WiFi, etc. to transmit information associated with the determination.

The electronic device 204 may be configured to determine the amount of force. For example, the electronic device 204 may only register a strike if the force is greater than a predetermined threshold (set by a user or a designer). Additionally, the electronic device may display an amount of force detected and/or provide an average of detected forces applied to each or all of the target areas 214. In some examples, the electronic device 204 may be configured to cumulate the force applied to a target area 214, compare the cumulated result to a predetermined threshold, and provide an indication that the target area is 'closed out' when the cumulated force exceeds the threshold.

Information associated with the determination made by the electronic device 204 includes an audio and/or visual indication of a strike upon a target area 214, a number of strikes against the target areas within a time period, an amount of force applied to the target areas, a competitor's number of strikes, etc. The determination may also prompt a user as to which target area to contact. The determination may also include statistical information including strikes per a time period, a frequency of strikes during different time periods, a distribution of force applied to the different target areas, etc.

Method of Manufacture Embodiment

Figure 8:
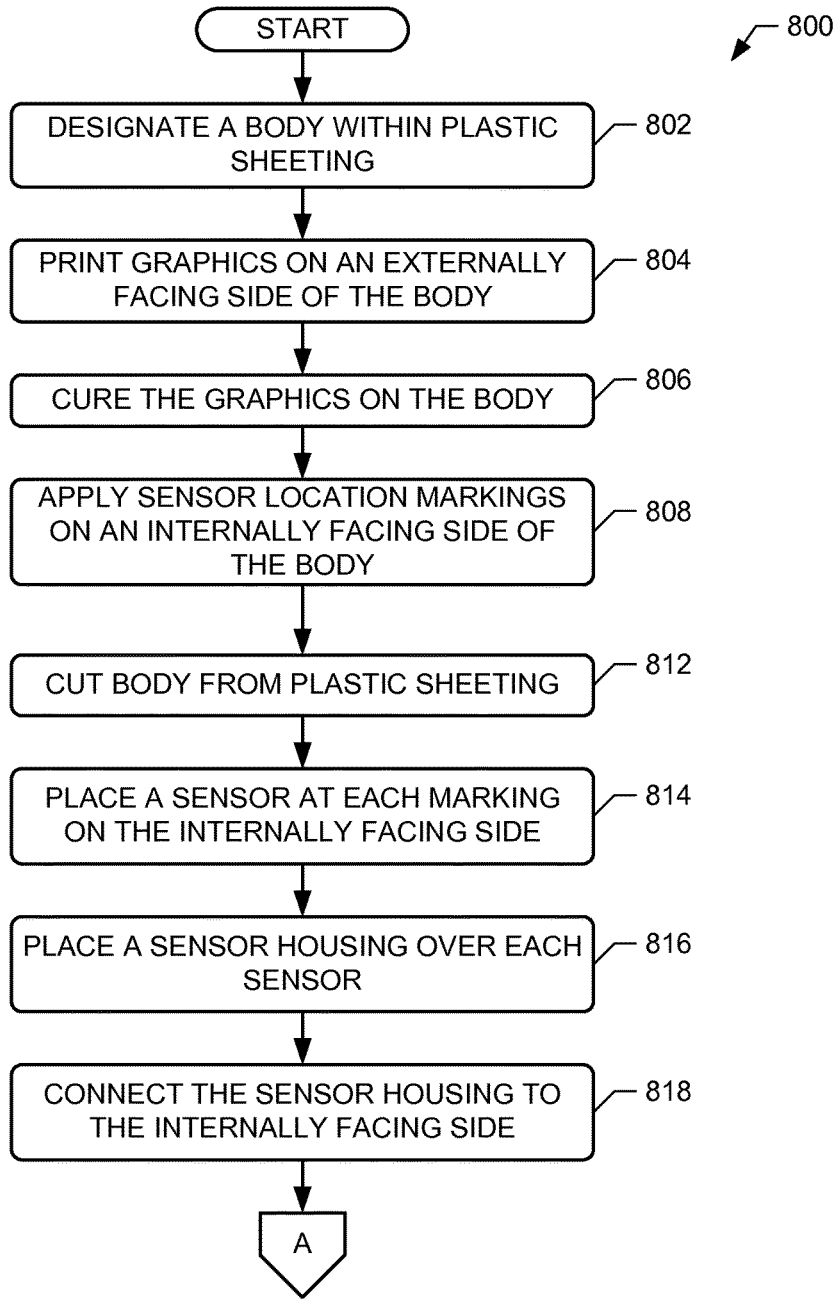
FIGS. 8 and 9 show a flow diagram illustrating example procedures to manufacture the kickboxing apparatus of FIGS. 2 to 7, according to an example embodiment of the present disclosure.
Figure 9:
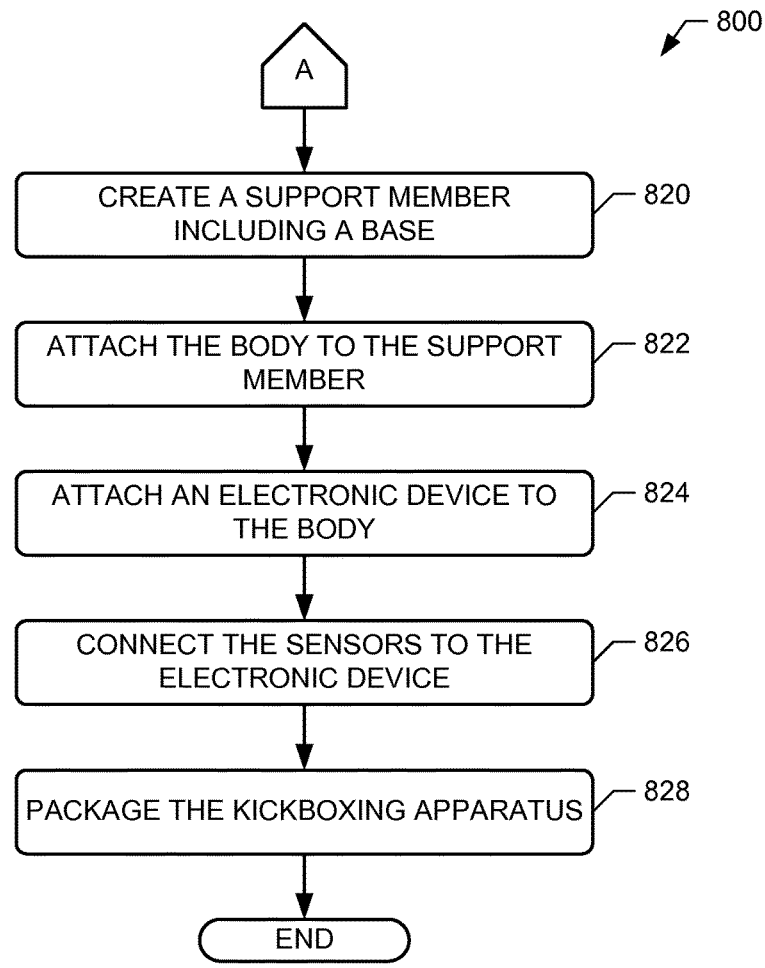

FIGS. 8 and 9 show a flow diagram illustrating example procedure 800 to manufacture the kickboxing apparatus 200 of FIGS. 2 to 7, according to an example embodiment of the present disclosure. The example procedure 800 may be carried out by, for example, machines, computers, and/or servers within a manufacturing facility. It should be appreciated that the example procedure 800 is executed by one or more machines for each kickboxing apparatus 200.

Although the procedure 800 is described with reference to the flow diagram illustrated in FIGS. 8 and 9, it will be appreciated that many other methods of performing the functions associated with the procedure 800 may be used. For example, the order of many of the blocks may be changed, certain blocks may be combined with other blocks, and many of the blocks described are optional. For instance, the present procedure 800 does not include steps for manufacturing sensors 206 and the electronic device 204. In other examples, the procedure 800 may include the steps of combining the circuit board 602 with the separation layer 604 and the contact layer 606 and/or steps of populating a circuit board of the electronic device 204, programming the appropriate components, and placing the circuit board in a housing.

The procedure 800 begins when a plastic sheet (or any other type of material suitable for the body 202) is fabricated and at least one body 202 is designated within the sheet (block 802). The designation can include marking and/or pressing edges of the body 202 in relation to the sheet. The designation may also include cutting the body 202 from the plastic sheet. A machine then prints, or otherwise forms, graphics on an externally facing side 210 of the body 202 (block 804). The graphics include target areas 214. The graphics may also include a character, a design, a picture, etc.

A machine then cures the printed graphics (block 806). Curing can include heating the body 202. In some embodiments, the graphics may be fabricated or integrated with the body 202 during creation of the plastic sheet. In these embodiments, the printing and curing steps may be omitted.

A machine operating the example procedure 800 next applies sensor location markings to an internally facing side 212 of the body 202 (block 808). The markings can include an outline of a sensor 206, lines or points designating a location of at least one edge of a sensor 206, and/or lines or points designating a center of a sensor 206. In embodiments where the body 202 is still attached to a plastic sheet, a machine at this point cuts or detaches the body 202 from the plastic sheet (block 812).

With the body 202 detached, a machine operating the example procedure 800 places a sensor 206 at each of the designated sensor locations on the internally facing side 212 (block 814). At this point, each sensor 206 includes wires that are later connected to the wire connector 302. A machine then places a sensor housing 216 over each sensor 206 (block 816). It should be appreciated that the sensor housings 216 are formed (e.g., cut from plastic sheeting) before or during the steps 802 to 814.

A machine next connects each of the sensor housings 216 to the respective sensor 206 (block 818). FIG. 3 shows an embodiment of the sensors 206 connected to the body 202 (note that the wires from the sensors 206 are connected to the wire connector 302). The dashed lines around each sensor 206 represent the connection between the sensor housing 216 and the internally facing side 212 of the body 202. As described in conjunction with FIGS. 4 and 5, the machine connects the sensor housing using a chemical adhesive and/or a mechanical fastener. The machine may alternatively use a heat press or heat stake to make the connection. It should be noted that the wire portion 502 of the sensor housing 216 is not connected, thereby providing a path for wires 612, 614, 618, and 620 to connect the sensor 206 to an electronic device 204.

Figure 10:
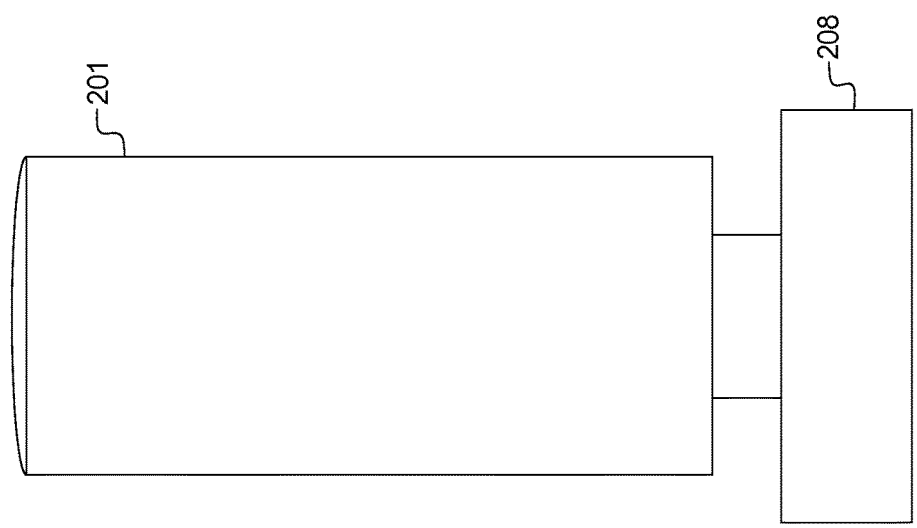
FIG. 10 shows a diagram of an example support member connected to a base prior to attachment of the body of FIGS. 2 and 3, according to an example embodiment of the present disclosure.

A machine then executes the example procedure 800 of FIG. 9 by creating a support member 201 including a base 208 (block 820). FIG. 10 shows diagram of an example of the support member 201 connected to the base 208 prior to attachment of the body 202. The support member 201 and/or base 208 may be formed by combining separate pieces of plastic sheeting. The support member 201 and/or base 208 may also be formed by injection molding. In some embodiments, the support member 201 may be integrated with the base 208. Alternatively, the support member 201 may be permanently connected to the base 208, removably connected to the base 208, or moveably (e.g., rotatably) connected to the base 208.

Figure 11:
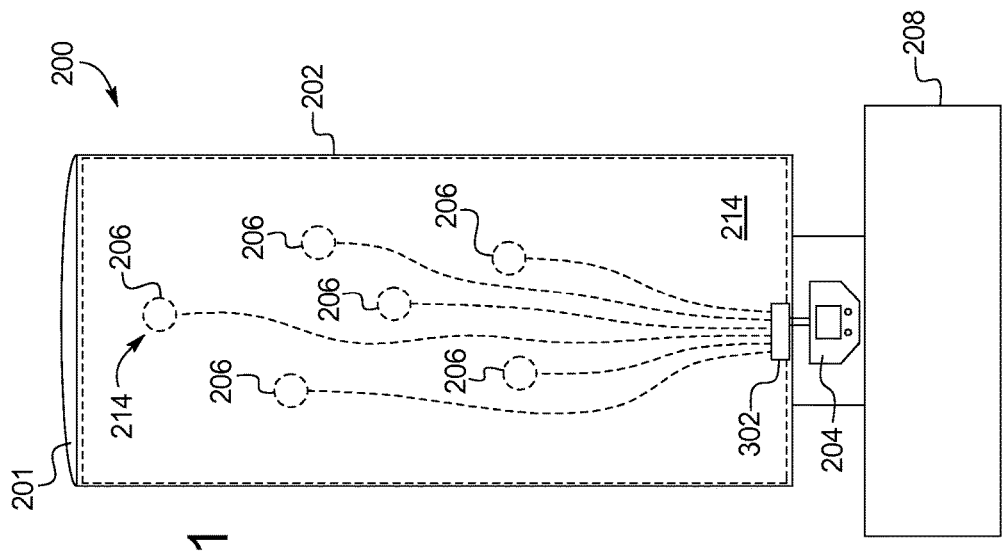
FIG. 11 shows a diagram of the body of FIGS. 2 and 3 connected to the support member of FIG. 10, according to an example embodiment of the present disclosure.

A machine next attaches the body 202 to the support member 201 (block 822). FIG. 11 shows a diagram of the body 202 connected to the support member 201. It should be appreciated that the externally facing side 214 is shown. The dashed lines indicate the locations of the sensors 206 and wires on the internally facing side 212, which are not externally viewable. The body 202 may be attached by heat pressing or heat staking edges of the body 202 to edges or portions of the support member 201. Alternatively, the body 202 maybe chemically and/or mechanically attached to the support member 201. After connecting the body 202, a machine connects the electronic device 204 to the body 202, the base 208, and/or the support member 201 (block 824). In some embodiments, the electronic device 204 is removably connected. In other embodiments, the electronic device 204 is permanently connected.

A machine then connects the wire connector 302 to the electronic device 204 (block 826). At this point, the kickboxing apparatus 200 is finished and may be tested by quality control to ensure there are no manufacturing defects. After inspection, a machine packages the kickboxing apparatus (block 828). The example procedure 800 then ends for this kickboxing apparatus 200.

Improvements Provided by the Disclosed Kickboxing Apparatus

Figure 1:
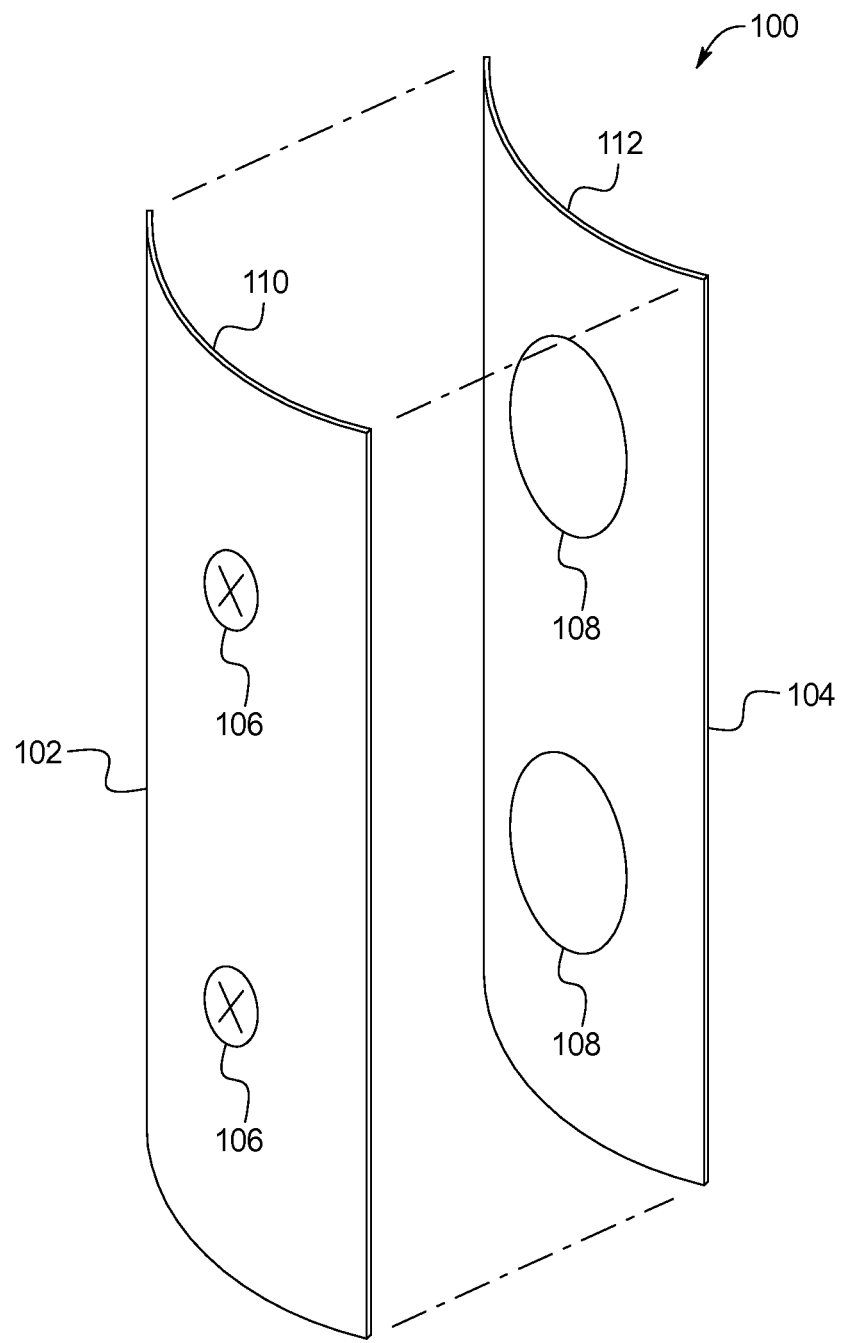
FIG. 1 shows a diagram of an exploded partial view of a known prior art punching bag.

The relative elegance of the disclosed kickboxing apparatus 200 compared to known punching bag 100 should be readily apparent based on the above disclosure. It should be appreciated that the use of the sensor housing 216 to secure the sensor 206 to the body 202 provides a relatively simple, yet, effective system to detect contacts or strikes from a user. Placing the sensor 206 directly against the body 202 significantly reduces the chances of the sensor 206 being misaligned from a target area 214. Further, there are fewer chances of rips or tears in the connection of the sensor housing 216 to the internally facing side 212 compared to the inner shell 112 of the known punching bag 100 of FIG. 1. Further, positioning the sensor 206 against the body 202 provides for relatively more accurate force detection because there is less material for the force to propagate through. In some ways, the use of the inner shell 112 with the outer shell 110 and the corresponding air gap in the known punching bag 100 functions has a buffer to muffle contact force.

It should also be appreciated that significantly less material is used in the sensor housings 216 compared to the inner shell 112, thereby reducing material costs and chances of product defects. For instance, the inner shell 112 of the known punching bag 100 of FIG. 1 includes a plastic layer for support, a sensor layer and an electrical contact layer for detection, and a foam layer interspaced between the sensor and electrical contact layers. In total, this can comprise one to five square meters of material. In contrast, the sensor housings 216 and sensors 206 have areas that are on the order of tens of square centimeters. The use of fewer materials in the disclosed kickboxing apparatus 200 results in significant material cost reductions. Further, the use of fewer materials reduces inspection costs and the probability of having manufacturing (or material) defects.

It should further be appreciated that the disclosed configuration of the kickboxing apparatus 200 prevents packaging creases to affect performance. For example, the known punching bag 100 of FIG. 1 and the example kickboxing apparatus 200 of FIG. 2 are folded to fit into product packaging. This folding causes creases to form in the shells 102 and 104 and the body 202. The punching bag 100 may have sensing performance reduced if a crease occurs in proximity to a sensor 108 because there is less sensing area to make contact with an applied force. In contrast, the example sensor 206 is positioned directly adjacent to the body 202 such that any creases will not significantly affect the force reaching the contact layer 606. Further, the hard circuit board 602 effectively prevents creases from forming in the sensor 206, thereby improving sensing accuracy.

Rotatable Kickboxing Apparatus Embodiment

Figure 12:
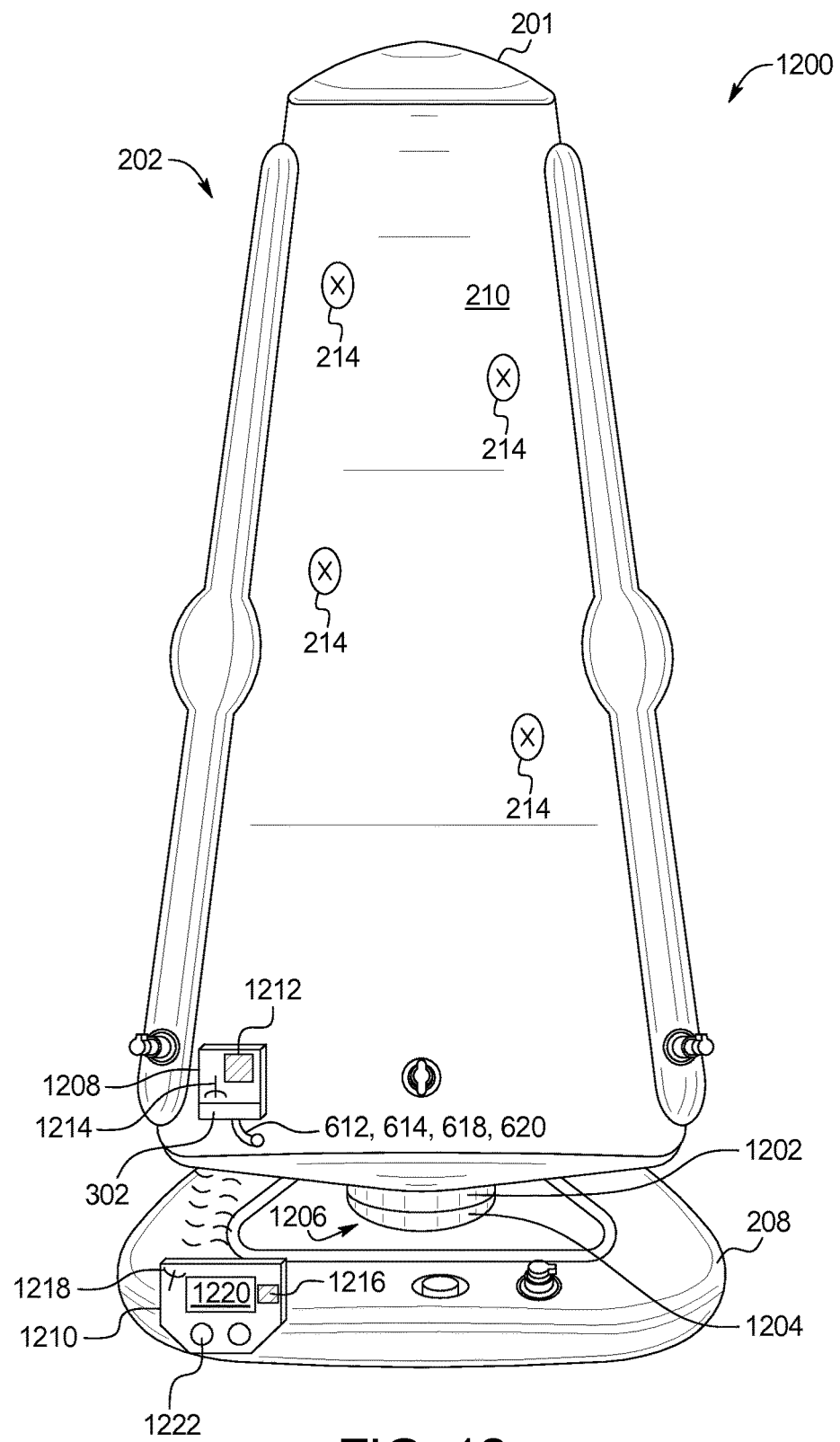
FIG. 12 shows a diagram of an example rotatable kickboxing apparatus, according to an example embodiment of the present disclosure.

As disclosed above, the example kickboxing apparatus 200 discussed in conjunction with FIGS. 2 to 11 may rotate or spin. FIGS. 12 to 18 provide details regarding how the example kickboxing apparatus 200 rotates. FIG. 12 shows a diagram of an example rotatable or spinning kickboxing apparatus 1200, according to an example embodiment of the present disclosure. Similar to the kickboxing apparatus 200 of FIGS. 2 to 11, the example kickboxing apparatus 1200 of FIG. 12 includes a support member 201, a body 202, and a base 208. The example support member 201 includes an enclosed inflatable plastic shell or container. The example body 202 includes a plastic sheet with an externally facing side 210 and an internally facing side (not shown). The plastic sheet includes graphics and target areas 214. Force sensors (not shown) are located behind the target areas 214 and are configured to detect an object contacting the respective target area.

The body 202 is connected to an exterior side of the support member 201. For example, edges of the body 202 may be molded or otherwise connected to the support member 201. As shown in FIG. 12, the support member 201 has a pyramid-shape with three sides. The body 202 is attached to each of the three sides. Alternatively, the body 202 may be attached to one or two of the sides. In yet other embodiments a separate body 202 may be attached to each side of the support member 201. The example support member 201 is configured to be inflatable to hold the body 202 upright for use by a user.

The example base 208 includes a soft or hard) plastic shell. The base 208 may be inflatable or filled with water, sand, rocks, etc. The example base 208 is configured to support the support member 201 and the body 202.

Figure 13:
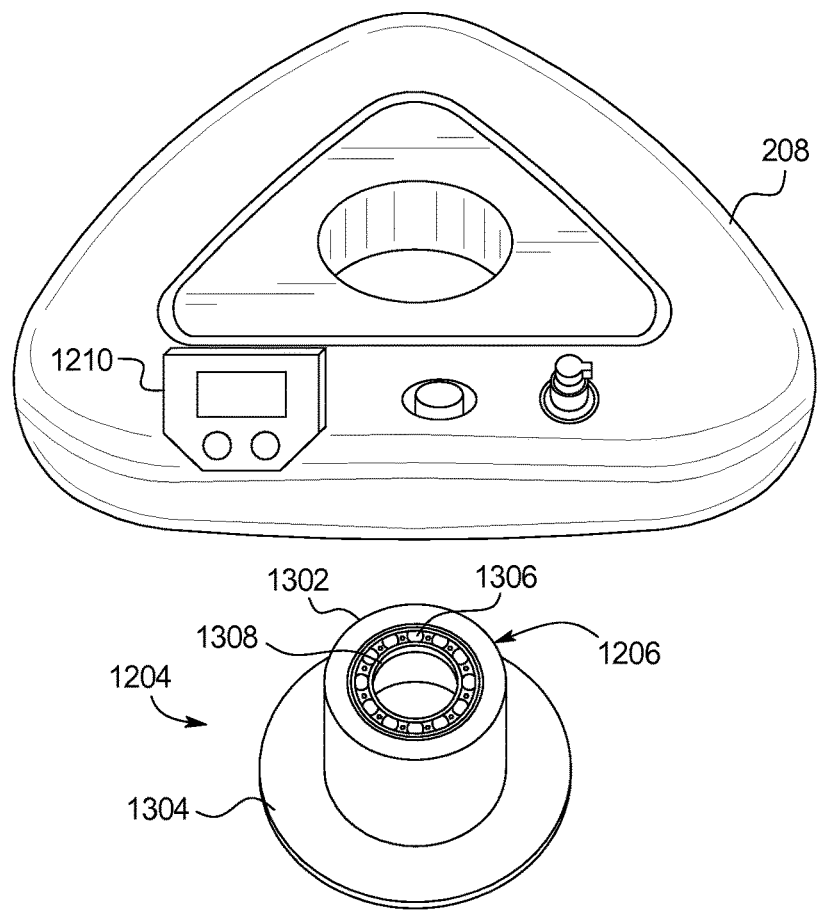
FIG. 13 shows a diagram of a stand removed from a base of the kickboxing apparatus of FIG. 12, according to an example embodiment of the present disclosure.

In the illustrated example of FIGS. 12 and 13, the support member 201 and the body 202 are rotatable with respect to the base 208. To enable the rotation, the support member 201 includes or is attached to a first connector 1202 and the base 208 includes a stand 1204 having a second connector 1206. The second connector 1206 is configured to rotate within the stand 1204, thereby allowing the support member 201 and the body 202 to rotate when the first connector 1202 is secured to the second connector 1206. The first connector 1202, the stand 1204, and the second connector 1206 are discussed in further detail in conjunction with FIGS. 13 to 17.

The example rotating kickboxing apparatus 1200 also includes a first electronic device 1208 and a second electronic device 1210. At least one of the first electronic device 1208 and the second electronic device 1210 may include features of the electronic device 204 of FIG. 2. The first electronic device 1208 includes a wire connector 302 that is connected to sensors via respective wires 612, 614, 618, and 620, for example. The wires may exit the body 202 at a certain point and terminate at the wire connector 302. The first electronic device 1208 may be attached to the body 202 via any mechanical connector or chemical adhesive. Alternatively, a plastic housing may be connected to the body 202. The first electronic device 1208 may be secured within the plastic housing for attachment to the body 202.

The first electronic device 1208 also includes a power source (not shown), a processor 1212, and a transceiver 1214. The example processor 1212 is configured to receive indications of strikes from the sensors (e.g., an analog voltage) and convert the indications into one or more messages. The processor 1212 is configured to transmit the messages to the transceiver 1214, which concerts the messages into a wireless form and wirelessly transmits the messages. The example first electronic device 1208 may also include a memory storing instructions regarding how the indications from the sensors are to be structured into one or more messages. The instructions may also specify one or more timed sequences for activating the light emitting devices 616 and/or playing sounds.

The first electronic device 1208 may also include a power switch and an audio indicator. The example audio indicator may transmit an audio sound when the first electronic device 1208 is powered on and another audio sound when the power supply has relatively low available power. The audio indicator, per instruction from the processor 1212, may also transmit an audio sound when one or more of the sensors detect an object striking one of the target areas 214.

The first electronic device 1208 may be configured to provide power to the sensors via the wires. In addition, the processor 1212 may be configured to determine when a light emitting device 616 associated with a sensor is to be illuminated. For instance, upon detection of a hit at a target area 214, the processor 1212 may cause a light emitting device 616 associated with the contacted target area 214 to illuminate. The processor 1212 may also cause a speaker to transmit an audio indication of the hit and transmit one or more messages indicative of the hit to the transceiver 1214.

The example second electronic device 1210 is configured to be connected to the base 208. The second electronic device 1210 may be attached to the base 208 via any mechanical connector or chemical adhesive. Alternatively, a plastic housing may be connected to the base 208, with the second electronic device 1210 being secured within the plastic housing. In some instances, the second electronic device 1210 may be removable from the housing and still be in wireless communication with the first electronic device 1208. The second electronic device 1210 includes a processor 1216, a transceiver 1218, a display 1220, a control interface 1222, a power source (not shown), a memory storing instructions for operation of the processor 1216, and/or a speaker (not shown).

The example transceiver 1218 is configured to wirelessly receive messages from the transceiver 1214 of the first electronic device 1208. The transceiver 1218 converts the wireless messages into a format for processing by the processor 1216. The example processor 1216 is configured to process the messages to update, for example, information shown by the display 1220. For instance, the processor 1216 may determine a message includes an indication of a strike to one of the target areas 214 and accordingly updates a counter of a total number of hits shown by the display 1220.

The example control interface 1222 includes one or more buttons to enable a user control information shown by the display 1220 and/or select elements/types of a game to be played by a user.

The example transceivers 1214 and 1218 may include any type of wireless interface controller that supports any wireless interface protocol. For example, the transceivers 1214 and 1218 may communicate via Bluetooth®, Zigbee®, Near Field Communication ("NFC"), radio frequency, etc. In some instances, the transceivers 1214 and 1218 may be paired to exclusively communicate with each other at the time of manufacture.

In some instances, the processor 1216 may determine one or more messages that are to be transmitted to the first electronic device 1208. The messages may, for example, instruct the processor 1212 to cause one or more lights to illuminate in response to a detected hit. Additionally or alternatively, the messages may instruct the processor 1212 to cause one or more lights to illuminate based on a predefined pattern, which may, for example, coincide with a game being operated by the processor 1216.

It should be appreciated that the wireless connection between the first electronic device 1208 and the second electronic device 1210 enables data to be transferred while enabling the support member 201 to rotate with respect to the base 208. Overtime, wires routed across a rotating interface may become tangled or worn and eventually crack/break. In contrast, the above described configuration provides a simpler and more robust configuration because wires no longer have to be routed across a rotating connection interface between the first connector 1202 and the second connector 1206. Instead, data regarding strikes are transmitted wirelessly between the electronic devices 1208 and 1210.

In some embodiments, the first electronic device 1208 may be omitted. In these embodiments, the sensors may each include a transceiver for transmitting messages indicative of strikes to the second electronic device 1210. It should be appreciated that in these embodiments, each of the sensors/transceivers may be connected to a power source contained within the body 202, the support structure 201, or received wirelessly (e.g., via inductive or capacitive coupling) from a power source at the second electronic device 1210.

Rotating Kickboxing Apparatus Base Embodiments

Figure 14:
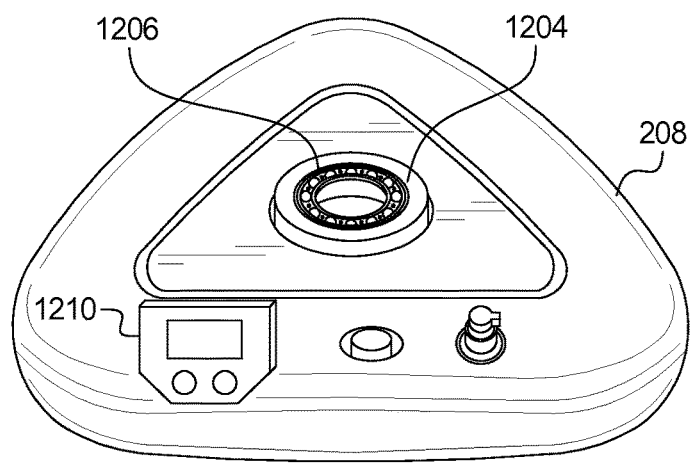
FIG. 14 shows a diagram of the stand placed within the base of FIG. 13, according to an example embodiment of the present disclosure.

FIGS. 13 and 14 show diagrams of the base 208 of the example rotating kickboxing apparatus 1200 of FIG. 12, according to an example embodiment of the present disclosure. Specifically, FIG. 13 shows a diagram of the stand 1204 removed from the base 208 while FIG. 14 shows a diagram of the stand 1204 within the base 208. In some instances, the stand 1204 may be separate from the base 208 in product packaging such that a user has to insert the base 208 over the stand 1204. In other examples, the base 208 and the stand 1204 may be integrated or otherwise connected.

As mentioned above, the example base 208 may be inflatable or comprise a hard plastic/rubber shell that can accommodate water, sand, etc. to provide weight. The base 208 is connected to the second electronic device 1210. It should be appreciated that the second electronic device 1210 may be located anywhere on the base 208.

As illustrated in FIG. 13, the stand 1204 includes a cylindrical neck 1302 connected to a circular bottom support 1304. A diameter of the circular bottom support 1304 is larger than a diameter of the cylindrical neck 1302 so that the neck 1302 does not topple over during use. The cylindrical neck 1302 and support 1304 may be integrated together and formed via plastic molding. In other examples, the cylindrical neck 1302 is connected to the support 1304. The stand 1204 may be machine-lathed, three-dimensionally printed, etc. While the stand 1204 is shown as having a circular shape, in other embodiments the stand 1204 may have a rectangular shape, a triangular shape, a bar shape, a pentagonal shape, etc.

The cylindrical neck 1302 of the stand 1204 includes the second connector 1206 of FIG. 12. As illustrated in FIGS. 13 and 14, and shown in more detail in FIG. 15, the second connector 1206 includes a rolling element bearing 1306 that includes ball bearings configured to enable the second connector to rotate. The second connector 1206 also includes an inner ring 1308 that defines a window. The inner ring 1308 is configured to rotate with the rolling element bearing 1306 and connect to a protrusion from the first connector 1202. The defined window is configured to enable the protrusion of the first connector to pass through the inner ring 1308, thereby creating a secure connection.

Figure 15:
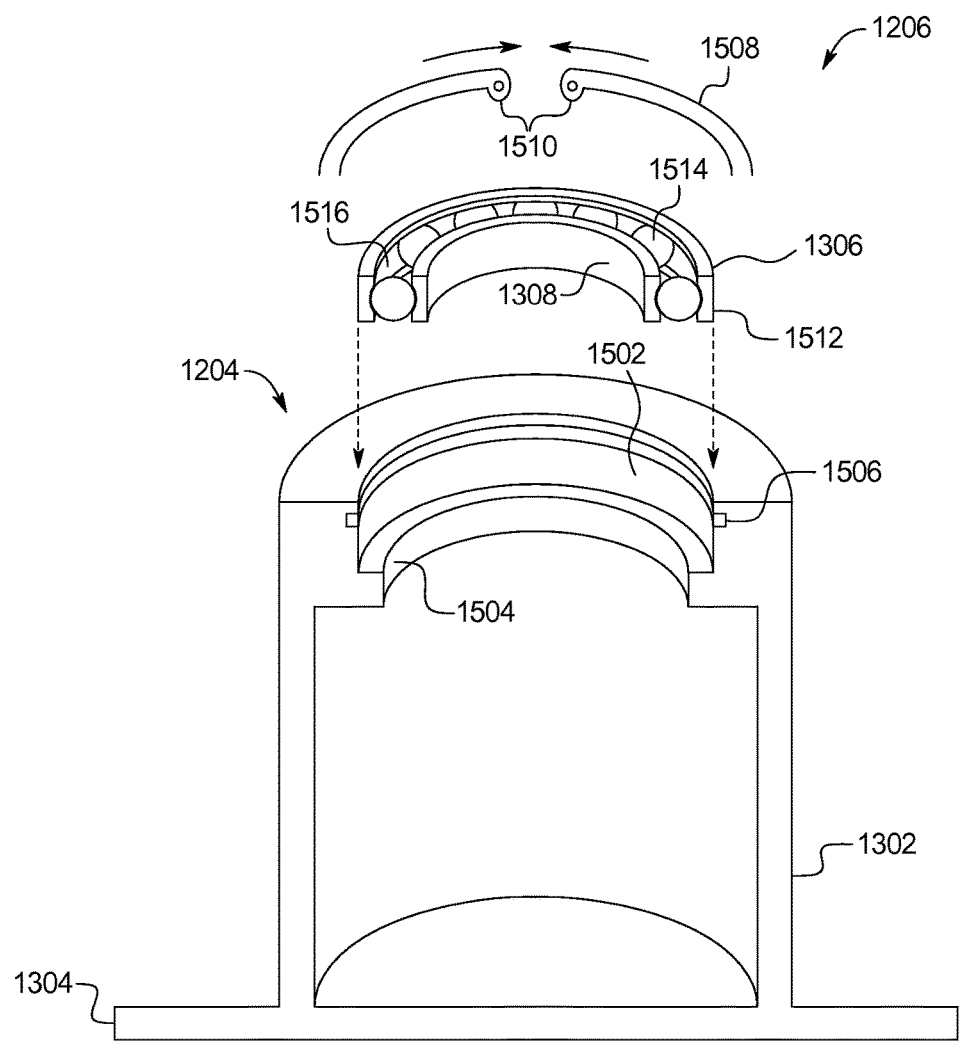
FIG. 15 shows a side-perspective cutaway view of the stand of FIGS. 12 to 14, according to an example embodiment of the present disclosure.

FIG. 15 shows a side-perspective cutaway view of the stand 1204 of FIGS. 12 to 14, according to an example embodiment of the present disclosure. As illustrated, a top portion of the cylindrical neck 1302 includes a circular recessed channel 1502 configured to accept the rolling element bearing 1306. A ledge or lip 1504 of the circular recessed channel 1502 is configured to enable the rolling element bearing 1306 to rest thereon. The circular recessed channel 1502 also includes a groove 1506 configured to accept a snap ring 1508, which is configured to secure the rolling element bearing 1306 within the circular recessed channel 1502. For example, after the rolling element bearing 1306 has been placed within the circular recessed channel 1502, the snap ring 1508 may be squeezed together at point 1510 and lowered into the cylindrical neck 1302. The pressure applied to the snap ring 1508 may be relaxed when the snap ring 1508 is aligned with the groove 1506. The relaxing of pressure causes a diameter of the snap ring 1508 to expand to fit within the groove 1506. This configuration enables the rolling element bearing 1306 to rotate freely without exiting the circular recessed channel 1502.

In some examples, an outer ring 1512 of the rolling element bearing 1306 may be mechanically or chemically attached to the circular recessed channel 1502. Rolling elements 1514 and the inner ring 1308 of the rolling element bearing 1306 may still rotate freely under these examples. The rolling elements 1514 may include balls, bearings, cylinders, or any other structure or material capable of rolling and/or translating horizontally along a surface and/or reducing friction to near-zero (e.g. a lubricant). The rolling elements 1514 are separated by spacers 1516, which are configured to keep each of the rolling elements 1514 an equal distance apart from each other. The spacers 1516 may also cover the rolling elements 1514 to maintain the rolling elements 1514 within the circular recessed channel 1502.

Each of the inner ring 1308 and the outer ring 1512 may include a channel that is in contact with the rolling elements 1514. The channels may be formed of semi-circular grooves. The rolling elements 1514 may be configured to roll within the semi-circular grooves. Such a configuration enables the inner ring 1308 to rotate while the outer ring 1512 is fixed. It should be appreciated that rolling elements 1514 and the inner ring 1308 may rotate at different speeds.

In some instances, the rolling element bearing 1306 may include a damper configured to restrict rotation of the rolling elements 1514 such that the body 202 and the support structure 201 do not rotate too fast. The damper may be electronically controlled such that the processor 1216 may actuate the damper at the end of a gaming session or to vary the rotation speed as an element of a kickboxing game. The damper may also be user controlled to enable a user to control how much force is needed to cause the support structure 201 to rotate.

Rotating Kickboxing Apparatus Connector Embodiments

Figure 16A:
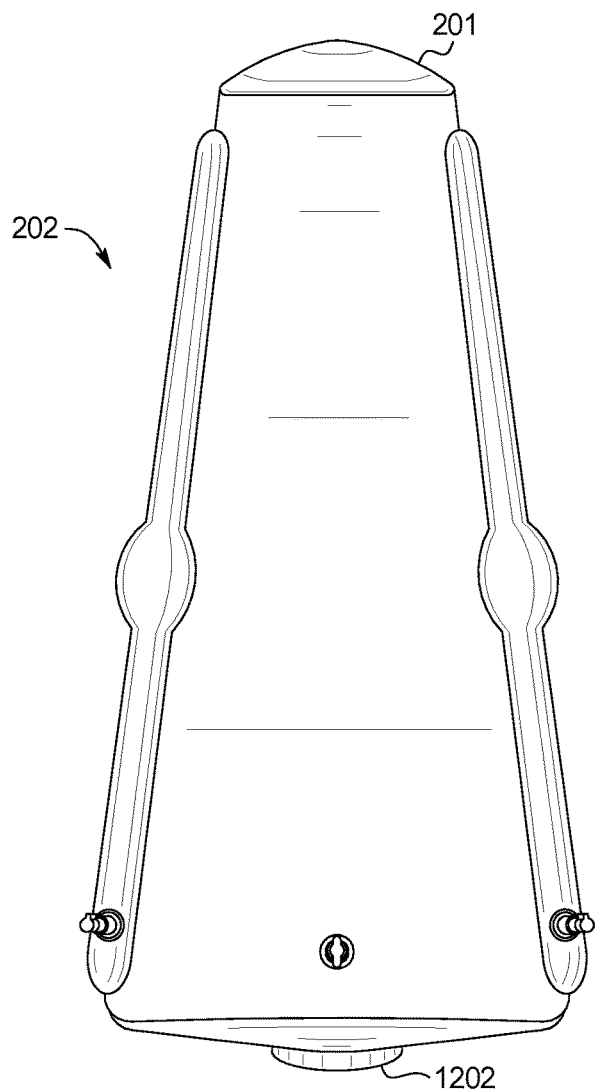
FIGS. 16A and 16B show diagrams of a first connector of a support member of the kickboxing apparatus of FIG. 12, according to an example embodiment of the present disclosure.
Figure 16B:
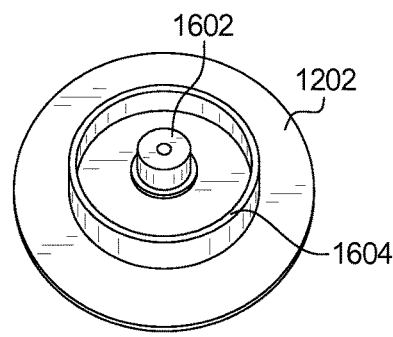

FIGS. 16A and 16B show diagrams of the first connector 1202 of the support member 201, according to an example embodiment of the present disclosure. As illustrated in FIG. 16A, the first connector 1202 is connected to a bottom portion of the support member 201. In some embodiments, the first connector 1202 may include a top portion and a bottom portion that sandwich the bottom portion of the support member 201. The top portion is connected to the bottom portion via one or more screws or rivets. Such a configuration keeps the support member 201 airtight. In other embodiments, the first connector 1202 may be integrated with or be molded to the support structure 201. In yet other embodiments, the first connector 1202 may be connected to or integrated with the body 202.

Figure 17:
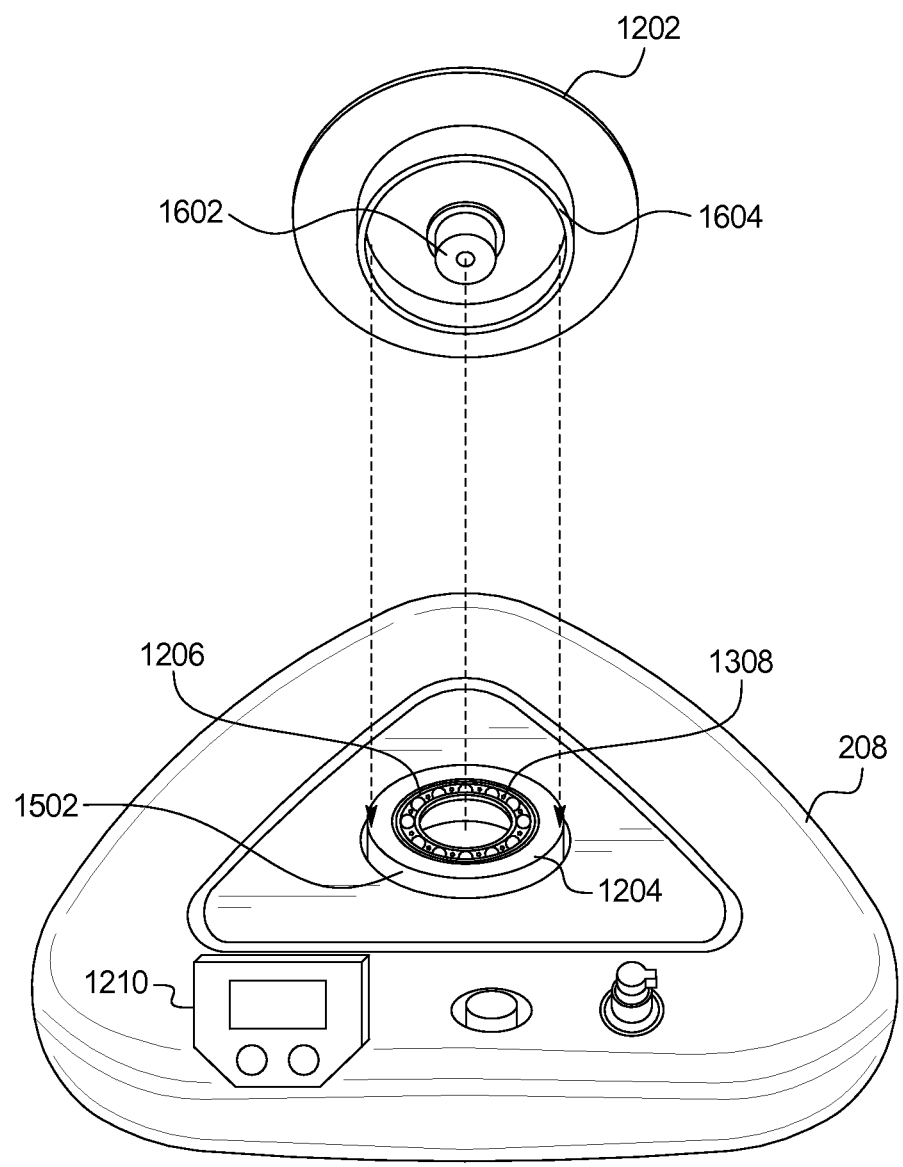
FIG. 17 shows a diagram of a connection between the first connector and a second connector of the kickboxing apparatus of FIG. 12, according to an example embodiment of the present disclosure.

FIG. 16B shows a bottom perspective view of the first connector 1202, according to an example embodiment of the present disclosure. The first connector 1202 includes a protrusion 1602 and a wall 1604. As shown in FIG. 17, the example protrusion 1602 is configured to fit within the window defined by the inner ring 1308 to create a secure connection between the first connector 1202 and the second connector 1206. The protrusion 1602 may include a channel along a circumference of the protrusion that is configured to receive a lip or edge of the inner ring 1308 to provide a more secure connection. While the protrusion 1602 is shown as having a cylindrical shape, the protrusion may have any shape that corresponds to a shape defined by the inner ring 1308.

The example wall 1604 is configured to be placed outside of the cylindrical neck 1502 to provide lateral support for the support member 201. It should be appreciated that the wall 1604 and other any other portion of the first connector 1202, except the protrusion 1602, does not contact the stand 1204. Otherwise, friction may occur between the stand 1204 and the first connector 1202, thereby reducing rotation velocity.

Rotating Kickboxing Apparatus Motor Embodiments

Figure 18:
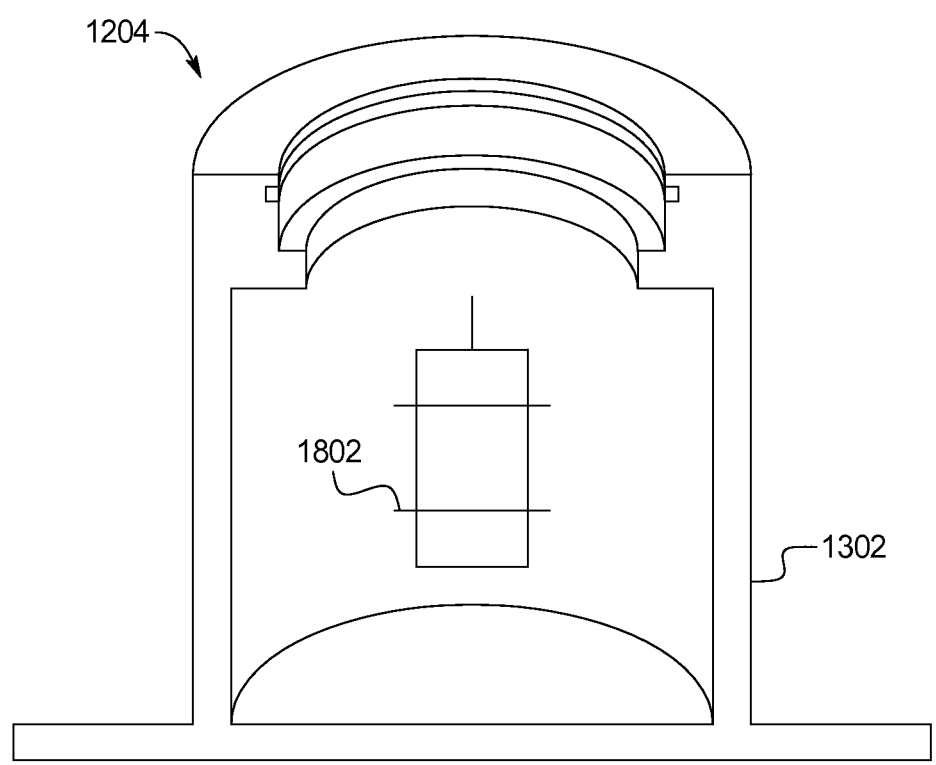
FIG. 18 shows a diagram of a side-perspective cutaway view of the base of FIG. 12 including a motor, according to an example embodiment of the present disclosure.

In some embodiments, the example rotating kickboxing apparatus 1200 may be rotated by a rotor or a motor. Such a configuration may increase the complexity of a kickboxing game by having the support member 201 and the body 202 rotate automatically, thereby moving the target areas 214 during gameplay. FIG. 18 shows a diagram of a side-perspective cutaway view of the base 1204 of FIG. 12 including a motor 1802, according to an example embodiment of the present disclosure. The motor 1802 may include an electric motor such as a DC or AC motor. Alternatively, the motor 1802 may be an electrostatic motor or any other motor suitable for converting electrical current into mechanical rotation. In yet other examples, the motor 1802 may include a rotor or any other device configured to rotate the rolling element bearing 1306.

The motor 1802 may be fixed to an interior side of the stand 1204 using fins, brackets, and/or mounting bolts. A shaft of the motor 1802 may represent a male portion that is insertable into a female portion in the protrusion 1602 and/or the rolling element bearing 1306. Accordingly, when the first and second connectors 1202 and 1206 are coupled together, the motor 1802 becomes mechanically coupled to at least one of the connectors.

The motor 1802 may also be electronically communicatively coupled to the second electronic device 1210 (or the first electronic device 1208) via any wired or wireless connection. For example, the second electronic device 1210 may transmit instructions to the motor, causing the motor to rotate at a specified speed and/or direction. The second electronic device 1210 may provide the instructions based on a type of difficulty level for a kickboxing game. The instructions may include digital messages or an AC voltage.

Rotating Kickboxing Apparatus Alternative Embodiment

In an alternative embodiment, the first and second connectors 1202 and 1206 may be reversed. For example, the first connector 1202 may be located at the stand 1204 while the second connector 1206 is connected to a bottom portion of the support structure 201. The protrusion 1602 of the first connector 1202 may be placed in the stand 1204. Additionally, the rolling element bearing 1306 may be within the circular recessed channel 1502 of the second connector 1206, attached to the support structure 201.

Rotating Kickboxing Apparatus User Device Embodiments

Figure 19:
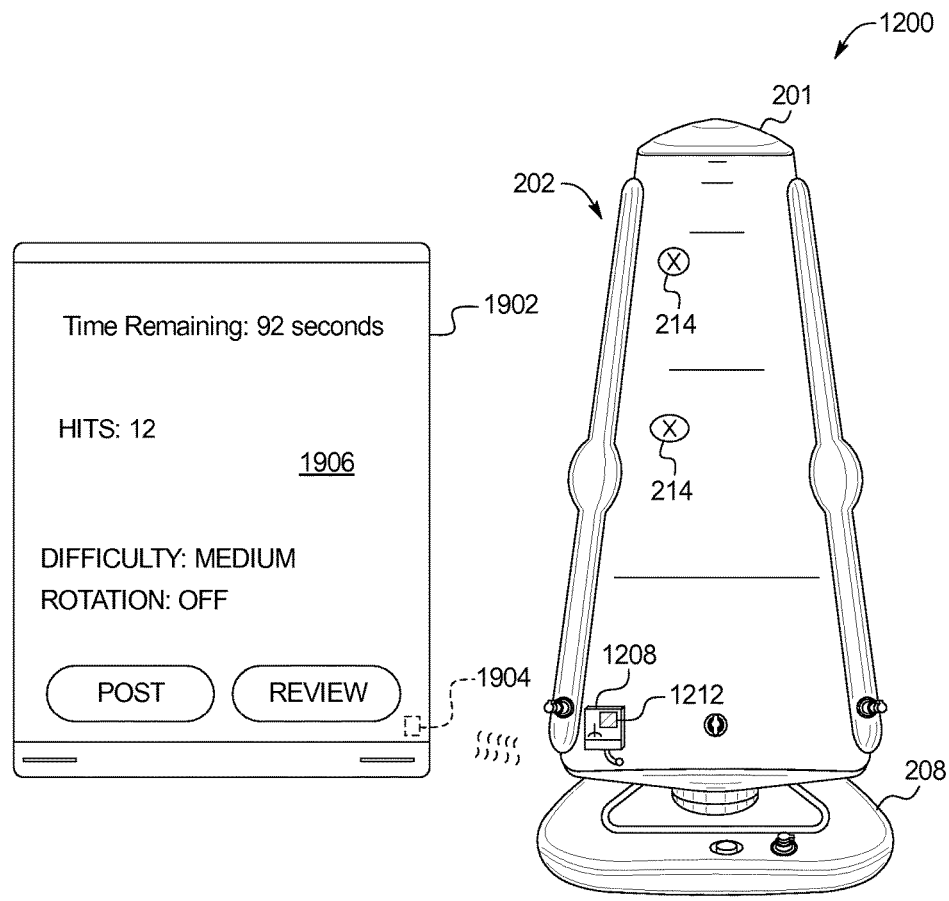
FIG. 19 shows a diagram of a user device in communication with the kickboxing apparatus of FIG. 12, according to an example embodiment of the present disclosure.

As discussed above, the rotating kickboxing apparatus 1200 includes the first electronic device 1208 and the second electronic device 1210 for displaying information regarding a kickboxing game or to enable a user to select a type of element of a kickboxing game. FIG. 19 shows a diagram where the second electronic device 1210 may be replaced by a user device 1902, such as a smartphone, according to an example embodiment of the present disclosure. In this embodiment, the first electronic device 1208 transmits one or more messages indicative of a strike of the target areas 214 to the user device 1902. The transmission may use any wireless protocol such as, for example, Bluetooth®, Zigbee®, Near Field Communication ("NFC"), radio frequency, Wifi, etc.

The example user device 1902 includes an application 1904 that is configured to display, within a user interface 1906, information transmitted within the messages from the first electronic device 1208. For example, FIG. 19 shows that the application 1904 may provide information about a time remaining during a kickboxing game session, a number of hits during the session, and setting information. It should be appreciated that the application 1904 may provide further information that may be dependent on the kickboxing game type. For instance, multiple user information may be provided for multi-user games or history information may be provided for training games.

The setting information may include features for a user to select a specific timed sequence, a user-defined timed sequence, a random sequence, a rotation speed, and rotation direction of the kickboxing apparatus 1200. The setting information may also include an option to change a force detection setting for the sensors attached to the body 202. Selection of any of these settings causes the application 1904 to transmit the information, via the user device 1902, to the first electronic device 1208. The setting information may be used by the processor 1212 for controlling the rotation of the support member 201 and the body 202 (to the extent the processor 1212 is connected to a motor). The force detection setting information may be used to determine when strikes are to be detected (in instances where an amount of force can be determined by the sensor).

The example application 1904 may also store kickboxing data in a memory as historical data. The application 1904 may track the historical data from multiple gameplay sessions and display in the user interface 1906 trends or progressions related to the historical data in tabular or graphical form. A user may view the historical data by selecting, for example, the "Review" button in the user interface 1906. The historical data may include a total number of strikes from each session, a calculated user scores from each session based on the total number of strikes, an amount of force detected by the sensors, a number of strikes in a predetermined time period detected during each session, etc.

The example application 1904 may also transmit information from a kickboxing session or historical data to one or more social media accounts of a user. For example, the user may select the "Post" button in the user interface 1906 to select gameplay data to transmit. For example, a user may post a kickboxing game score to a Facebook® or Twitter® account. Alternatively, the user may post a game score to an account for a competition among users that have the same product. For instance, a competition manager may create a Facebook® page, or their own webpage, that provides an award to certain users. A user may select the "Post" button to transmit gameplay information from the user device 1902 to the competition page such that the user is considered for a prize.

Alternatively, transmission of gameplay data may cause the webpage to provide unlocked features such as game types or variations to the application 1904. In some instances, the application 1904 may transmit one or more unlocked features to the first electronic device 1208 to enhance or change the functionality of the lights, sound, or rotation of the kickboxing apparatus 1200. For instance, one feature may cause the light emitting devices 616 of FIG. 6 to blink or turn off and on at a specified sequence while a speaker of the first electronic device 1208 transmits a corresponding audio tone or song.

It should be appreciated that while FIG. 19 shows the first electronic device 1208 in communication with the user device 1902, in other embodiments, the second electronic device 1210 is present and in communication with the user device 1902. In these other embodiments, a user may use either of the second electronic device 1210 or the user device 1902 to select and control gameplay of the kickboxing apparatus 1200. Further, the user device 1902 may be used to control rotation and/or features of the kickboxing apparatus through the second electronic device 1210.

CONCLUSION

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which The invention is claimed as follows:

1. A rotating boxing apparatus comprising:
   a body connected to an inflatable support member, the body including:
      an exterior surface, and
      an interior surface,
         wherein a bottom portion of the inflatable support member includes a first connector configured to enable the support member and the body to be rotatable;
   a sensor attached to a portion of the interior surface of the body, the sensor configured to detect an object striking a portion of the exterior surface of the body; and
   a base configured to be connected to the bottom portion of the body, the base including:
      a stand positioned inside the base and defining a circular recessed channel, and
      a second connector secured within the circular recessed channel and configured toconnect to the first connector of the support member, the second connector configured to rotate within the circular recessed channel,
   wherein the connection of the first connector to the second connector enables the body and the support member to be rotatable with respect to the base.

2. The apparatus of claim 1, wherein the second connector includes:
   a rolling-element bearing configured to enable the second connector to rotate within the circular recessed channel of the stand; and
   an inner ring defining a window, the inner ring configured to rotate via the rolling-element bearing.

3. The apparatus of claim 2, wherein the first connector includes a protrusion configured to be insertable into the window of the inner ring such that insertion of the protrusion into the inner ring causes the first connector to securely connect to the second connector while enabling the body and the support member to rotate with respect to the base.

4. The apparatus of claim 1, wherein the body is connected to a first electronic device that is communicatively coupled to the sensor via a wire, the first electronic device configured to:
   receive a signal from the sensor responsive to the sensor detecting the object striking the portion of the exterior surface; and
   transmit a message wirelessly indicative of the sensor detection.

5. The apparatus of claim 1, wherein the base includes a second electronic device wirelessly communicatively coupled to the first electronic device and configured to:
   receive the message wirelessly from the first electronic device; and provide
   at least one of an audio or visual indication of the detected strike.

6. The apparatus of claim 5, wherein the second electronic device is configured to cause the support member to rotate responsive to the sensor detecting the object striking the portion of the exterior surface of the body.

7. The apparatus of claim 1, wherein the second connector includes:
   a rotor configured to enable the second connector to rotate within the circular recessed channel of the stand; and
   an inner ring defining a window, the inner ring configured to rotate via the rotor,
   and
   wherein the first connector includes:
   a protrusion configured to be insertable into the window of the inner ring such that insertion of the protrusion into the inner ring causes the first connector to securely connect to the second connector while enabling the body and the support member to rotate with respect to the base.

8. A rotating boxing apparatus comprising:
   a support member including a first connector located at a bottom portion of the support member and a body;
   a sensor attached to the body, the sensor configured to detect an object striking a portion of an exterior side of the body;
   a stand including:
      a circular recessed channel,
      a second connector secured within the circular recessed channel and configured to connect to the first connector, the second connector configured to rotate within the circular recessed channel, and
      a motor mechanically coupled to the second connector,
   wherein the first connector is rotatable with respect to the second connector; and
   an electronic device communicatively coupled to the sensor and configured to send an instruction to the motor to cause the motor to rotate the support member with respect to the stand via rotation of the second connector, the electronic device includes a memory configured to store instructions, which when executed by a processor, causes the electronic device to:
      determine a number of strikes to the body by counting each signal received from the sensor; and
      transmit the number of strikes to a display configured to visually show the number of strikes.

9. The apparatus of claim 8, wherein the instruction includes at least one of a digital signal or an analog signal.

10. The apparatus of claim 8, wherein the instruction from the electronic device specifies at least one of a rotation speed and a rotation direction.

11. The apparatus of claim 10, wherein the electronic device includes a memory configured to store instructions, which when executed by a processor, causes the electronic device to determine the at least one of the rotation speed and the rotation direction based on a:
    pre-programmed timed sequence;
    a user-programmed timed sequence;
    or a random sequence.

12. The apparatus of claim 8, wherein the electronic device includes a memory configured to store instructions, which when executed by a processor, causes the electronic device to:
    operate a timer for a session having a duration;
    determine the number of strikes with respect to the session; and
    transmit a value of the timer periodically to the display to show at least one of a time remaining of the duration or a total elapsed time.

13. The apparatus of claim 10, wherein the electronic device includes a memory configured to store instructions, which when executed by a processor, causes the electronic device to:
   establish a direct wireless connection with a mobile device; and
   determine a number of strikes to the body by counting each signal received from the sensor; and
   transmit the number of strikes to the mobile device causing an application operating on the mobile device to visually show the number of strikes.

14. The apparatus of claim 13, wherein the application is configured to track user scores and strike totals from a plurality of sessions and display historical data about the plurality of sessions to a user in graphical or tabular form.

15. The apparatus of claim 10, wherein the electronic device includes a memory configured to store instructions, which when executed by a processor, causes the electronic device to:
   establish a wireless connection with a mobile device via a network;
   determine a number of strikes to the body by counting each signal received from the sensor; and
   transmit the number of strikes to the mobile device causing an application operating on the mobile device to visually show the number of strikes.

16. A rotating boxing apparatus comprising:
a body including:
an exterior surface,
an interior surface, and
a bottom portion including a rotatable connector, the rotatable connector includes:
   a circular recessed channel,
   a rolling-element bearing secured within the circular recessed channel, and
   an inner ring defining a window, the inner ring configured to rotate via the rolling-element bearing;
a sensor attached to a portion of the interior surface of the body, the sensor configured to detect an object striking a portion of the exterior surface of the body; and
a base configured to be connected to the bottom portion of the body, the base including a stand positioned inside the base and defining a protrusion connector configured to engage a first rotatable connector,
wherein the first rotatable connector rotates relative to the protrusion connector.

17. The apparatus of claim 16, wherein the protrusion is configured to be insertable into the window of the inner ring such that insertion of the protrusion into the inner ring causesthe rotatable connector to securely connect to the support member while enabling the body to rotate with respect to the base.

18. The apparatus of claim 16, wherein the protrusion includes a channel along a circumference of the protrusion, the channel configured to engage a lip of the inner ring thereby securing the protrusion to the inner ring.

* * * * *